Aug. 9, 1966  C. H. T. PAN ETAL  3,265,452
BEARINGS

Filed May 4, 1965  4 Sheets-Sheet 1

INVENTORS
CODA H. T. PAN
ELIE B. ARWAS
BY
Walter F. Wessendorf Jr
Attorney

Aug. 9, 1966   C. H. T. PAN ETAL   3,265,452
BEARINGS
Filed May 4, 1965   4 Sheets-Sheet 2
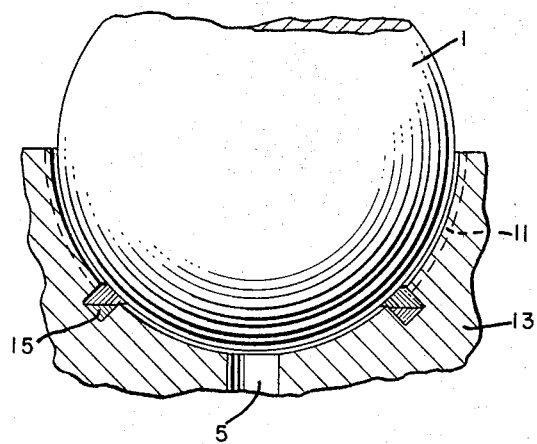
FIG. 4.
FIG. 5.
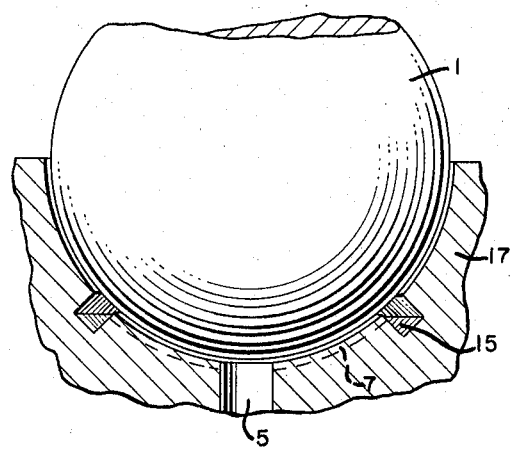
FIG. 6.
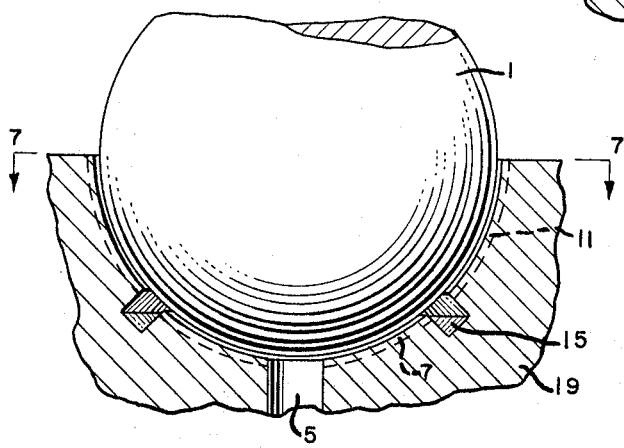
INVENTORS
CODA H. T. PAN
ELIE B. ARWAS
BY
Walter F. Wassenloy Jr
attorney Aug. 9, 1966  C. H. T. PAN ETAL  3,265,452
BEARINGS Filed May 4, 1965  4 Sheets-Sheet 3

INVENTORS
CODA H. T. PAN
ELIE B. ARWAS
BY
Walter F. Wessendorf Jr
attorney

Aug. 9, 1966    C. H. T. PAN ETAL    3,265,452
BEARINGS
Filed May 4, 1965    4 Sheets-Sheet 4

INVENTORS
CODA H. T. PAN
ELIE B. ARWAS
BY
Walter L. Wessendorf Jr
ATTORNEY 3,265,452
BEARINGS
Coda H. T. Pan, Latham, and Elie B. Arwas, Schenectady, N.Y., assignors to Mechanical Technology Incorporated, Latham, N.Y., a corporation of New York
Filed May 4, 1965, Ser. No. 456,888
1 Claim. (Cl. 308—9)

This application is a continuation-in-part of application Serial No. 217,373, filed August 16, 1962, now abandoned.

This invention relates to self-acting, gas lubricated journal bearings for spherically configured journals.

An example of the use of spherically configured journals received within hemispherically configured and complemental bearings is that of the compressor shaft. The compressor shaft rotates at very high speeds and presents problems relating to capacities of the bearing for high thrust or axial load, combined radial and thrust load and self-alignment.

This invention and the several embodiments thereof solve the problems of high thrust load capacity, combined radial and thrust load capacity and self-alignment capacity.

This object and other objects of the invention should be appreciated from the detailed specification taken in conjunction with the drawings, in which like reference numerals refer to similar parts throughout the several views, in which:

FIG. 4 is a view, partly in section, of another embodiment of the invention;

FIG. 5 is a view, partly in section, of another embodiment of the invention;

FIG. 6 is a view, partly in section, of another embodiment of the invention;

Figure 1:
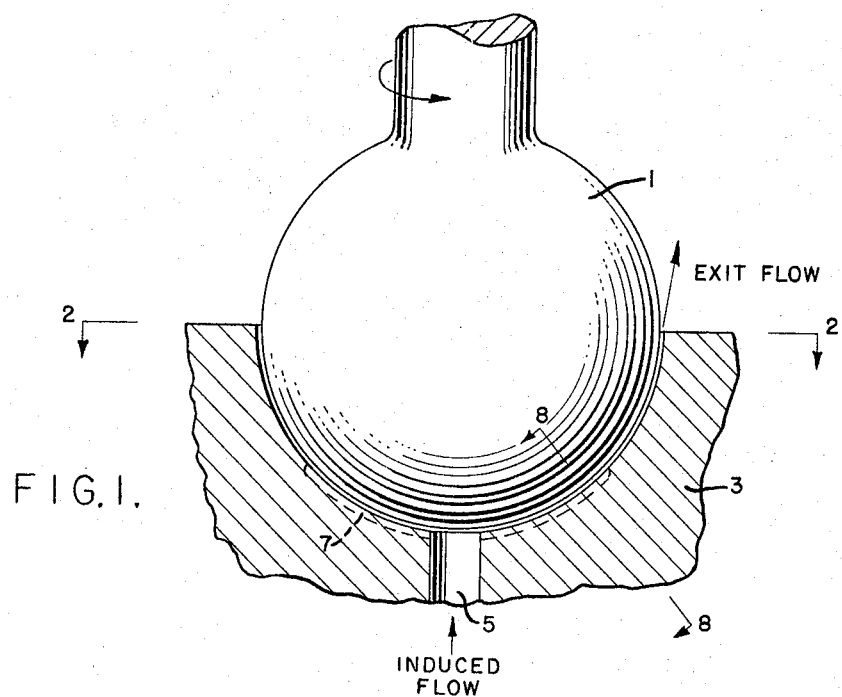
FIG. 1 is a view, partly in section, of one embodiment of the invention.

In FIG. 1 is shown a journal 1 of substantially spherical configuration rotating in bearing 3 of hemispherical complemental configuration. In FIG. 1 and in the other views the journal as viewed from the top rotates in a counterclockwise direction.

Figure 2:
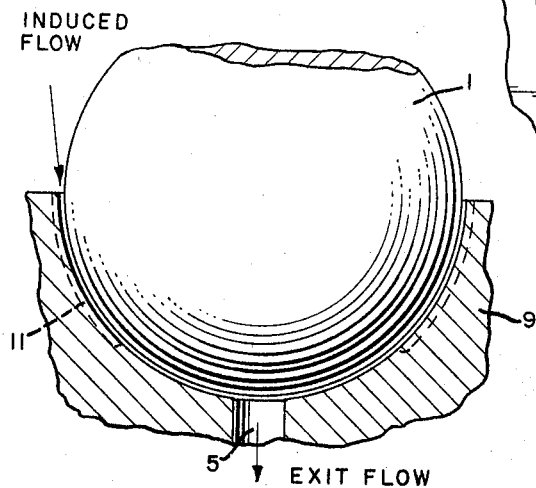
FIG. 2 is a fragmentary top plan view taken along the line 2—2 of FIG. 1.

Shown more discernibly in FIG. 2 are the spiraled grooves 7 formed in the bearing surface and which communicate with port 5 formed through the polar region of bearing 3 and in symmetrical alignment with the center line of bearing 3. The grooves 7 are in symmetrical arrangement on the bearing surface.

The bottom portion of the bearing where port 5 is located is referred to in the description of the embodiments of the invention as the polar region. The upper portion of the bearing is referred to in the description of the embodiments of the invention as the equatorial region. In this connection, and in the drawings, reference numeral 25 generally refers to the polar region and reference numeral 27 generally refers to the equatorial region, and which regions are designated in all the embodiments of the invention. Furthermore, what is meant by the terminology—region—is the thin gap volume that exists in the embodiments of the invention between the journals and their respective bearing surfaces. The region is filled with gas and it is there that the pressures are generated.

Figure 3:
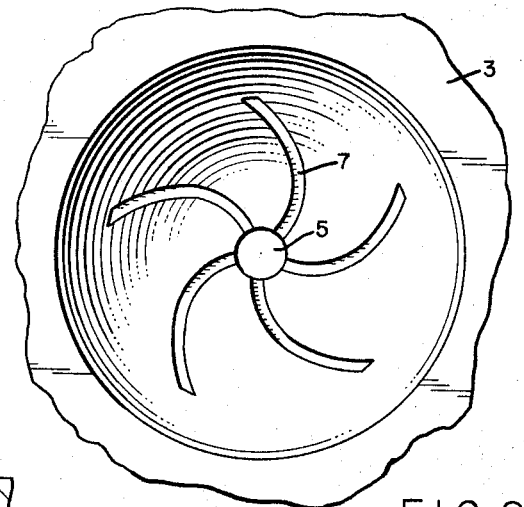
FIG. 3 is a view, partly in section, of another embodiment of the invention.

In FIG. 3, journal 1 is shown received in bearing 9 which has spiraled grooves 11 formed in the bearing surface commencing from the equatorial region of the bearing and symmetrically arranged thereon. Grooves 11 are shown more discernibly in FIG. 7.

In FIG. 4, journal 1 is shown received in bearing 13 which has spiraled grooves 11 formed in the bearing surface commencing from the equatorial region of the bearing and symmetrically arranged thereon. Grooves 11 communicate with a manifold 15. The manifold is a continuous groove formed on the bearing surface and in symmetrical arrangement thereon.

In FIG. 5, journal 1 is shown received in bearing 17 which has spiraled grooves 7 formed in the bearing surface commencing from communication with port 5 in the polar region and symmetrically arranged thereon. Grooves 7 communicate with manifold 15 formed on the bearing surface and in symmetrical arrangement thereon.

Figure 7:
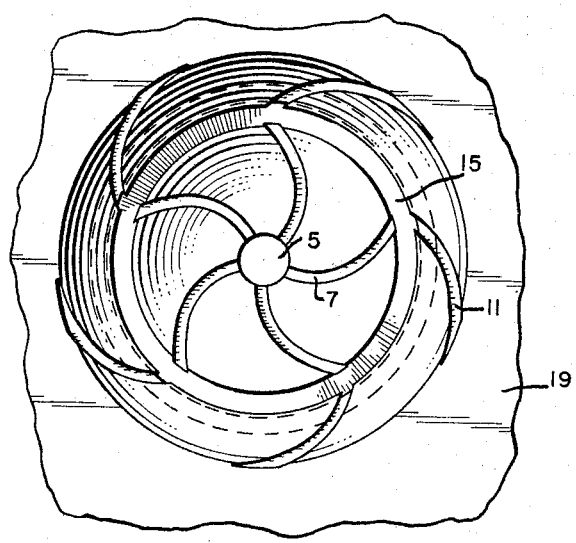
FIG. 7 is a fragmentary top plan view taken along the line 7—7 of FIG. 6.

In FIG. 6, journal 1 is shown received in bearing 19. Shown more discernibly in FIG. 7 are spiraled grooves 7 formed in the bearing surface commencing from communication with port 5 in the polar region and symmetrically arranged thereon. The spiraled grooves 11 formed in the bearing surface commencing from the equatorial region of the bearing and symmetrically arranged thereon are shown. Grooves 7 and 11 communicate with manifold 15.

Figure 8:
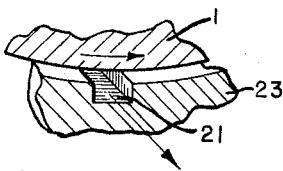
FIG. 8 is a fragmentary view of a journal and bearing of a feature of the invention.

In FIG. 8, the journal 1 is shown rotating relative to the groove 21 formed in bearing 23. The significance depicted is to show the flow of gas induced in groove 21 by rotation of journal 1. Groove 21 may be either one of grooves 7 or 11.

The depth of grooves 7 and 11 is made varying from two to four times the clearance between the journal and bearing. The grooves 7 and 11 and manifold 15 are depicted as square shaped in cross-section. The grooves 7 and 11 and manifold 15 may be cut to be semicircular in cross-section. The particular configuration of the grooves in cross-section will depend upon the method utilized to form same.

It is within the concept of this invention to form the grooving geometry of grooves 7 and 11 and manifold 15 on the journal 1 instead of on the bearing. In this situation the grooving will be in the opposite sense.

It should be appreciated that the spiraled grooves double as a step thrust bearing and as a viscous pump to feed the journal portion of the bearing. Parameters of bearing geometry that are variable for optimum design requirements of the bearing are the depth and width of the grooves, the spiral angle of the grooves and the length of the grooves. The bearing will be stiff from the geometry of the spiral grooving and the viscous pump feature of same will create positive pressures increasing the capacities of the bearing. By stiffness is meant that any dimensional changes in the separation between the surfaces of the journal and bearing automatically induce corresponding changes in the pressures in the affected regions, effectuated in this instance by the grooving geometry, which oppose the dimensional change separation. By viscous pump or viscous pump feature is meant the tangential velocity between the journal and the gas, i.e., the relative movement of the journal tangential to the gas such movement shears the gas and shear stresses are generated. These shear stresses are induced because of the viscosity of the gas and are transformed into the positive pressures which carry the load. Since the gas or fluid is sheared to effect the positive pressure generation and since this phenomenon is predicated upon the viscosity of the gas or fluid, the resulting effect of positive pressure generation from the cooperating structure and gas or fluid is referred to as the viscous pump feature.

In FIG. 1 flow of gas will be induced from port 5, as indicated, into the spiraled grooves 7 into the polar region of the bearing thereby creating positive pressures in this region. The thrust capacity of the bearing will be increased measurably contrasted to the negligible thrust capacity of a hemispherical bearing without the grooving geometry.

In FIG. 3 flow of gas will be induced from the equatorial region of spiraled grooves 11 and exit through port 5. Positive pressures will be created in the equatorial region. Higher pressures can be generated by the equatorial pumping grooves than by the polar pumping grooves because the linear speed is higher in the equatorial region and the grooving geometry over the length of the grooved region is more nearly constant in the equatorial region.

The equatorial grooves will reduce the attitude angle, provide greater stability and increase the threshold speed of the journal at which the precession phenomenon is encountered. A more involved discussion of the precession phenomenon may be discerned in the application of Elie B. Arwas and Beno Sternlicht entitled Bearings and filed August 2, 1962, Serial No. 214,316, now abandoned.

Along the spiraled grooves 7 and 11 the positive pressures generated will rise and fall. The effect of the manifold 15 will be to decrease the amplitude of the generated pressures and to make the amplitude of the generated pressures more nearly uniform. Accordingly where greater thrust capacity in the bearing is needed, the manifold would be eliminated.

Therefore it should be appreciated that the greatest amplitude of positive pressures will be generated in the bearing having both equatorial and polar grooving geometry. The gas flow induced from both the port 5 through grooves 7 and from the equatorial region through grooves 11 will be in opposition to one another building up greater gas pressures. The disadvantage of using equatorial and polar grooving geometry is the higher cost to manufacture the bearing and a secondary disadvantage of the stagnant region between the equatorial and polar groovings preventing the cooling effect of air flow.

It should be appreciated that the utility of the invention is not restricted to the vertical or horizontal disposition of the journal shaft.

Another advantage of the invention is the alignment capacity of a shaft having journals at each end received in hemispherical bearings. The lines of centers of the journal and bearings would indicate that the lines of centers are parallel to each other. In bearings for cylindrical journals the alignment of the bearings and journal must be maintained with clearances in the magnitude of one mil. In the spherical journal received in the hemispherical bearings the alignment factor is not as critical because of the capacity for self-alignment.

It is within the concept of this invention to utilize a journal generated either as a frustum of a right circular cone or a right circular cone received within a complementally configured bearing having the species of grooving geometry utilized with the hemispherical bearing. An advantage of the conical journal and complemental bearing is the lesser degree of clearance that would be permitted to be adjusted between journal and bearing.

Also within the concept of the invention is the use of an ellipsoidal journal and complemental bearing with the species of grooving geometry utilized with the hemispherical bearing.

Figure 9:
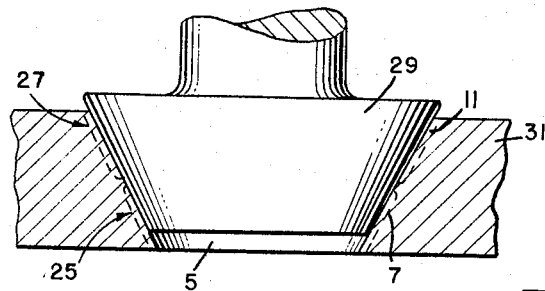
FIG. 9 is a view, partly in section, of another embodiment of the invention wherein the journal is generated as a frustum of a right circular cone received within a complementally configured bearing.

In FIG. 9 is shown a journal configured as a frustum of a right circular cone received within its complementally configured bearing 31. Bearing 31 has port 5, and grooving 7 and 11 provided in the polar and equatorial regions, respectively.

Figure 10:
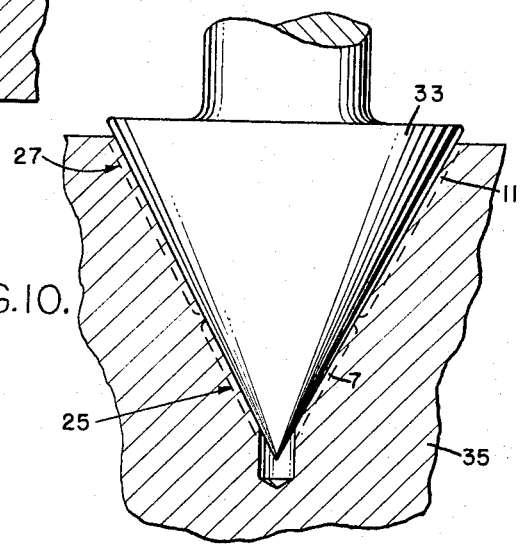
FIG. 10 is a view, partly in section, of another embodiment of the invention wherein the journal is generated as a right circular cone received within a complementally configured bearing.

In FIG. 10 is shown a journal 33 configured as a right circular cone received within its complementally configured bearing 35. Bearing 35 is provided with grooving 7 and 11 in the polar and equatorial regions, respectively. It should be noted that an inlet port is not necessary in this embodiment.

Figure 11:
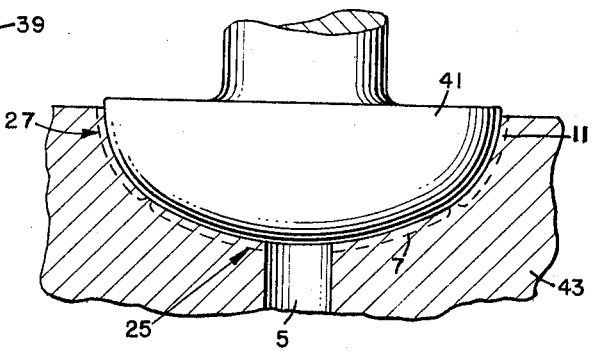
FIG. 11 is a view, partly in section, of another embodiment of the invention wherein the journal is of ellipsoidal configuration and is received within a complementally configured bearing.

In FIG. 11 is shown a journal 37 of ellipsoidal configuration received within its complementally configured bearing 39. Bearing 39 had port 5, and grooving 7 and 11 provided in the polar and equatorial regions, respectively.

Figure 12:
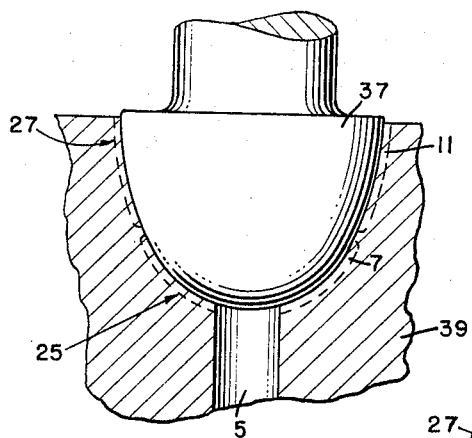
FIG. 12 is a view, partly in section of another embodiment of the invention wherein the journal is of ellipsoidal configuration and is received within a complementally configured bearing.

In FIG. 12 is shown journal 41 of another ellipsoidal configuration received within its complementally configured bearing 43. Bearing 43 has port 5, and grooving 7 and 11 provided in the polar and equatorial regions, respectively.

Not shown in the embodiments of FIGS. 9, 10, 11 and 12 are the manifolds 15 utilized in the prior embodiments with either the grooving 7 or grooving 11, or as a common manifold for both grooving 7 and 11. It should be appreciated, moreover, that with respect to each of the embodiments of FIGS. 9, 10, 11 and 12, grooving 7 and 11 and manifold 15 can be utilized as in the case of the prior embodiments.

Having thusly described our invention, we claim:

A combined journal and thrust bearing comprising,
- a stationary member having a top surface and a semispherical cavity formed therein,
- a rotating member designed with surfaces complementary to said cavity and positioned for rotation therein,
- a shaft integrally formed with said rotating member,
- an air gap between said members,
- an opening comprising a gas passageway formed in the bottom of the stationary member cavity for permitting the flow of gas lubricant through the air gap,
- grooves of a skewed geometry on said stationary member cavity walls for stiffening said bearing and generating positive pressures therein upon relative motion of said stationary and rotating members,
- said grooves being located between said opening in the cavity and the top surface of the stationary member and occupying less than the total distance therebetween; and
- said grooves having a width substantially less than the land width between adjacent grooves.

References Cited by the Examiner

UNITED STATES PATENTS

| | | | |
|---|---|---|---|
| 2,495,745 | 1/1950 | Litton | 308—159 |
| 2,722,463 | 11/1955 | Shaw et al. | 308—172 |
| 2,899,243 | 8/1959 | Acterman. | |
| 2,915,902 | 12/1959 | Brugger. | |
| 2,937,804 | 5/1960 | Reiner et al. | 308—9 |
| 3,016,273 | 1/1962 | Benoit. | |
| 3,063,041 | 11/1962 | Quade et al. | |
| 3,154,353 | 10/1964 | Haringx et al. | |

DAVID J. WILLIAMOWSKY, *Primary Examiner.*

FRANK SUSKO, *Examiner.*